US007635142B2

(12) United States Patent
Slagerman

(10) Patent No.: US 7,635,142 B2

(45) Date of Patent: Dec. 22, 2009

(54) LATCHING MECHANISM FOR A WHEELCHAIR FOOT REST ASSEMBLY

(75) Inventor: Murray G. Slagerman, Rosser (CA)

(73) Assignee: KI Mobility LLC, Stevens Point, WI (US)

( * ) Notice: Subject to any disclaimer, the term of this patent is extended or adjusted under 35 U.S.C. 154(b) by 521 days.

(21) Appl. No.: 11/344,499

(22) Filed: Feb. 1, 2006

(65) Prior Publication Data

US 2007/0194554 A1 Aug. 23, 2007

(51) Int. Cl.

| | |
|---|---|
| ***A61G 5/10*** | (2006.01) |
| ***B62J 25/00*** | (2006.01) |
| ***A47C 7/52*** | (2006.01) |

(52) U.S. Cl. ............... 280/304.1; 280/291; 297/423.19; 297/423.25; 297/423.37

(58) Field of Classification Search ............. 280/250.1, 280/291, 304.1; D12/131, 133; 297/423.19, 297/423.25, 423.33, 423.35, 423.36, 423.37; 248/229.11, 229.21, 230.2, 231.31, 291.1

See application file for complete search history.

(56) References Cited

U.S. PATENT DOCUMENTS

| | | | | |
|---|---|---|---|---|
| 3,765,709 | A * | 10/1973 | Van Wyck | 292/33 |
| 4,722,572 | A * | 2/1988 | Sata | 297/423.37 |
| 4,790,553 | A | 12/1988 | Okamoto | |
| 4,807,454 | A * | 2/1989 | Sengupta et al. | 70/277 |
| 4,988,114 | A * | 1/1991 | Thornton et al. | 280/304.1 |
| 6,234,576 | B1 * | 5/2001 | Fleigle | 297/423.37 |
| 6,499,756 | B2 * | 12/2002 | Amirola | 280/304.1 |
| 6,880,845 | B1 * | 4/2005 | Broyles et al. | 280/304.1 |
| 7,014,204 | B2 * | 3/2006 | Meyers et al. | 280/250.1 |
| 2002/0153697 | A1 | 10/2002 | Amirola | |
| 2004/0070164 | A1 | 4/2004 | Walsh et al. | |
| 2004/0155429 | A1 | 8/2004 | Knopf et al. | |
| 2004/0155508 | A1 | 8/2004 | Garven, Jr. | |

FOREIGN PATENT DOCUMENTS

| | | | |
|---|---|---|---|
| EP | 827729 | A2 * | 3/1998 |
| WO | WO 9208432 | A1 * | 5/1992 |

* cited by examiner

*Primary Examiner*—Lesley D Morris
*Assistant Examiner*—Daniel Yeagley
(74) *Attorney, Agent, or Firm*—Ryan W. Dupuis; Ade & Company Inc

(57) ABSTRACT

A latching mechanism permits a swing-away foot rest assembly on a wheelchair to be selectively latched into a use position extending forwardly from the wheelchair. Mating connectors are provided on the foot rest assembly and the frame of the wheelchair which are movable relative to one another by a transverse rocking pin which rocks about an upright lever axis in two directions to permit the latching mechanism to be released by deflecting a release lever coupled to the rocking pin in either one of two opposing directions. The release lever can be coupled to the rocking pin in a plurality of different orientations in the use position to suit the user. Camming faces on the connectors automatically align and load the mating connectors into an engaged position when the foot rest assembly approaches the use position from any one of multiple different directions. The camming faces also permit the connectors to be mated with one another in a wedging action to improve rigidity of the foot rest assembly in the latched position.

21 Claims, 16 Drawing Sheets

LATCHING MECHANISM FOR A WHEELCHAIR FOOT REST ASSEMBLY

FIELD OF THE INVENTION

The present invention relates to a foot rest assembly for a wheelchair, and more particularly relates to a latching mechanism for latching the foot rest assembly in a use position in which the foot rest assembly extends forwardly from the wheelchair for supporting the feet of an occupant of the wheelchair thereon.

BACKGROUND

Wheelchair portability and ease of use has been improved through various designs over the years. One notable improvement includes the removable and swing away foot rest assembly which has widespread use as a means of greater portability, ease of access, improved user transfer and increased mobility for both the user and related caregivers. Various examples of improvements to foot rest assemblies are disclosed in U.S. Pat. No. 4,790,553 to Okamoto and U.S. patent publications 2004/0070164 to Walsh et al., 2004/0155429 to Knopf et al., 2002/0153697 to Amirola and 2004/0155508 to Garven Jr.

Prior art foot rest assemblies typically provide a latching mechanism to secure the foot rest assembly in a use position extending forwardly from the occupant. Known latching mechanisms generally provide limited access to a release lever and are further limited in the direction which the latching mechanism or the foot rest assembly can be released. A common design involves positioning a release lever of the latch mechanism to be centered with respect to the frame members forming the foot rest assembly to lie generally in a common plane therewith so that the release lever is accessible from either side. Positioning of the release lever to be centered however provides limited access to the lever so that the lever is very difficult to operate for persons with limited mobility.

Typically latching mechanisms of the prior art employ the use of a locking pin which is selectively received within a mating hole. In order to properly align the pin with the hole and to provide ease of insertion of the pin into the hole, a sufficiently large tolerance therebetween is required so that the resulting latched foot rest assembly remains loose and is not fully fixed and rigid with respect to the wheelchair frame.

Several methodologies for pin retraction of the foot rest latching concept have been employed in the prior art. Typically a pinned-pivot lever is used to retract the sliding pin against the spring. The release works well, but has limitations in that the lever is mounted in one position only, creating left and right assemblies, or has a central mounting configuration that creates poor user accessibility. The design also demands that the lever travel in only one direction in order to retract the pin.

Prior art foot rest assemblies are further limited in that they are typically difficult to load onto the wheelchair frame, often requiring multiple steps of sliding, twisting or rotating and actuating a lever to position the foot rest assembly in a latched position on the wheelchair.

SUMMARY OF THE INVENTION

According to one aspect of the invention there is provided a wheelchair comprising a frame supported for forward rolling movement along the ground in which the frame comprises an upright front frame member and a foot rest assembly supported on the front frame member; the foot rest assembly comprising:

a main arm extending downwardly and outwardly from a pivot joint pivotally supporting the main arm on the front frame member for pivotal movement about an upright axis between a use position extending forwardly and a stored positioned extending laterally from the front frame member;

a support arm extending between the main arm and the front frame member below the pivot joint; and a latching mechanism for latching the foot rest assembly in the use position, the latching mechanism comprising:

- a first connector comprising a pin member and a second connector comprising a socket for matingly receiving the pin member therein in which one of the connectors is mounted on the front frame member and the other one of the connectors is mounted on the support arm for movement relative to the connector on the front frame member so as to selectively latch the foot rest assembly in the use position by engaging the connectors with one another; and
- a release lever extending generally laterally from the support arm in the use position of the foot rest assembly, the release lever being operatively connected to the connector on the support arm for displacing the connector on the support arm relative to the connector on the front frame member to disengage the connectors from one another and release the foot rest assembly from the use position.

By providing a laterally oriented release lever, the lever is readily accessible to persons with limited mobility to provide ease of latch access without restricting the foot rest assembly from being swung away into a released or stored position both into and outside of the wheelchair frame. The laterally extending release lever is also particularly suited for use with a linkage comprising a rocking pin which is generally pivotal about an upright lever axis in which the rocking pin permits the release lever to be readily releasable in opposing directions of rotation while also permitting the rocking pin to be reversible to position the release lever in multiple orientation extending laterally inwardly or laterally outwardly with respect to the foot rest assembly. Accordingly the latch handle can be configured to suit the user of the wheelchair. The bi-directional nature of the release lever also permits the lever to be released into the direction of desired rotation of the foot rest assembly away from the use position and into a released or stored position so that the direction of force applied to the release lever further assists in pivoting the foot rest assembly. The latching mechanism may also make use of chamfered edges on the pin member and mating socket member thereof in which the chamfered edges define top loading or side loading camming faces. The camming faces automatically displace the pin member relative to the socket member to provide clearance for aligning the two together prior to subsequent engagement. The mating chamfered edges of the pin member and socket member also result in the pin member being received within the socket member in a wedging action which provides a snug lateral fit at the connection to improve the foot rest assembly rigidity.

The main arm is preferably pivotal about the upright axis from the use position to a first stored position extending laterally inward and to a second stored position extending laterally outward.

The release lever is preferably pivotal about a lever axis from an engaged position towards either one of a first released position or a second released position, in which the connectors are engaged with one another in the engaged position and in which the connectors are disengaged from one another in both the first and second released positions, wherein the release lever is pivotal about the lever axis from the engaged position to the first released position in a first direction of rotation and is pivotal about the lever axis from the engaged position to the second released position in a second direction of rotation which is opposite the first direction of rotation. The first and second released positions of the lever may correspond to displacement of the main arm to the first and second stored positions respectively.

The release lever may be mountable on the support arm in the engaged position in two different orientations which are generally symmetrical with one another about the lever axis.

The lever may be mountable in the engaged position in a first orientation extending generally horizontal and inclined into a direction of pivotal movement towards the first released position and in a second orientation extending generally horizontal and inclined into a direction of pivotal movement towards the second released position.

In the preferred embodiment, the support arm comprises a main portion and a tube portion at an inner end of the main portion. The support arm connector is then mounted on a post slidably received within the tube portion. A biasing member may further be coupled to the post to bias the connector on the support arm towards the connector on the front frame member. A transverse rocking pin is preferably received through transverse apertures in the tube and the post in which the apertures are elongate in a longitudinal sliding direction of the post. The release lever is connected to the transverse rocking pin for movement therewith in this instance such that rocking movement of the transverse rocking pin within the transverse apertures about a lever axis of the release lever causes the post to be displaced against the biasing member to disengage the connectors from one another and release the foot assembly from the use position.

The transverse apertures may be provided on opposing sides of the tube in which both apertures in the tube are elongate in the longitudinal sliding direction of the post and receive the rocking pin therethrough. In this instance, the rocking pin is movable about the lever axis in two opposing directions to displace the post against the biasing member and disengage the connectors from one another.

There may be provided a mounting collar mounted concentrically about the tube in alignment with the transverse apertures to support the rocking pin. The collar preferably has an interior diameter which is spaced outwardly from the tube at respective ends of the collar to permit rocking movement of the collar relative to the tube about the lever axis. An inner surface of the collar preferably includes diametrically opposed portions which are near in dimension to an outer diameter of the tube so as to restrict movement of the collar relative to the tube to only rocking movement about the lever axis.

Alternatively, the rocking pin may include at least one flat side slidable along a mating side edge of the transverse apertures so as to restrict pivotal movement of the rocking pin about a respective longitudinal axis of the rocking pin.

In an alternate method of actuation, the connector may be released by sliding the rocking pin forward without pivoting or rocking about the lever axis.

The release lever is preferably mountable on the support arm in the engaged position in four orientations comprising: being sloped inwardly and forwardly; being sloped inwardly and rearwardly; being sloped outwardly and forwardly; and being sloped outwardly and rearwardly.

When there is provided a biasing member which urges the connector on the support arm into engagement with the connector on the front frame member, a top loading camming face is preferably located on at least one of the connectors which is arranged to displace the connector on the support arm away from the connector on the front frame member against the biasing member when the main arm is displaced vertically downward from a position spaced above the use position towards the use position.

In addition to the top loading camming face, at least one of the connectors preferably includes side loading camming faces thereon which are arranged to displace the connector on the support arm away from the connector on the front frame member against the biasing member when the main arm is pivoted from the stored position to the use position.

When the first connector is mounted on the support arm and the second connector is mounted on the front frame member, preferably a top loading camming face is located on a lower face of the first connector and a top loading camming face is located on an upper side of the second connector.

There may be provided a first retainer flange mounted on the front frame member to extend upwardly, spaced outwardly from the frame member and a second retainer flange mounted on the support arm extending downwardly for being received between the first retainer flange and the front frame member in the use position.

Preferably the pin member tapers towards a free end thereof for wedging engagement within the socket when the first and second connectors are engaged with one another. More particularly, a lateral dimension of the pin member is preferably reduced towards the free end thereof to provide a snug lateral fit of the pin member within the socket.

The tapering free end of the pin member may define a camming face which urges the first connector away from the second connector against the biasing member when the main arm is displaced towards the use position.

According to a second aspect of the present invention there is provided a wheelchair comprising a frame supported for forward rolling movement along the ground in which the frame comprises an upright front frame member and a foot rest assembly supported on the front frame member; the foot rest assembly comprising:

a main arm extending downwardly and outwardly from a pivot joint pivotally supporting the main arm on the front frame member for pivotal movement about an upright axis between a use position extending forwardly and a stored positioned extending laterally from the front frame member;

a support arm extending between the main arm and the front frame member below the pivot joint; and a latching mechanism for latching the foot rest assembly in the use position, the latching mechanism comprising:

- a first connector comprising a pin member and a second connector comprising a socket for matingly receiving the pin member therein in which one of the connectors is mounted on the front frame member and the other one of the connectors is mounted on the support arm for movement relative to the connector on the front frame member so as to selectively latch the foot rest assembly in the use position by engaging the connectors with one another; and
- a release lever extending generally laterally from the support arm in the use position of the foot rest assembly, the release lever being operatively connected to the connector on the support arm for displacing the connector on the support arm relative to the connector on the front frame member to disengage the connectors from one another and release the foot rest assembly from the use position;

wherein the release lever is pivotal about a lever axis from an engaged position towards either one of a first released position or a second released position, in which the connectors are engaged with one another in the engaged position and in which the connectors are disengaged from one another in both the first and second released positions; and wherein the release lever is pivotal about the lever axis from the engaged position to the first released position in a first direction of rotation and being pivotal about the lever axis from the engaged position to the second released position in a second direction of rotation which is opposite the first direction of rotation.

According to a further aspect of the present invention there is provided a wheelchair comprising a frame supported for forward rolling movement along the ground in which the frame comprises an upright front frame member and a foot rest assembly supported on the front frame member; the foot rest assembly comprising:

a main arm extending downwardly and outwardly from a pivot joint pivotally supporting the main arm on the front frame member for pivotal movement about an upright axis between a use position extending forwardly and a stored positioned extending laterally from the front frame member;

a support arm extending between the main arm and the front frame member below the pivot joint; and a latching mechanism for latching the foot rest assembly in the use position, the latching mechanism comprising:

- a first connector comprising a pin member and a second connector comprising a socket for matingly receiving the pin member therein in which one of the connectors is mounted on the front frame member and the other one of the connectors is mounted on the support arm for movement relative to the connector on the front frame member so as to selectively latch the foot rest assembly in the use position by engaging the connectors with one another; and
- a release lever extending generally laterally from the support arm in the use position of the foot rest assembly, the release lever being operatively connected to the connector on the support arm for displacing the connector on the support arm relative to the connector on the front frame member to disengage the connectors from one another and release the foot rest assembly from the use position;

wherein the release lever is pivotal about a lever axis from an engaged position, in which the connectors are engaged with one another, to a released position, in which the connectors are disengaged from one another, the release lever being mountable on the support arm in two different orientations which are generally symmetrical with one another about the lever axis.

According to yet another aspect of the present invention there is provided a wheelchair comprising a frame supported for forward rolling movement along the ground in which the frame comprises an upright front frame member and a foot rest assembly supported on the front frame member; the foot rest assembly comprising:

a main arm extending downwardly and outwardly from a pivot joint pivotally supporting the main arm on the front frame member for pivotal movement about an upright axis between a use position extending forwardly and a stored positioned extending laterally from the front frame member;

a support arm extending between the main arm and the front frame member below the pivot joint; and a latching mechanism for latching the foot rest assembly in the use position, the latching mechanism comprising:

- a first connector comprising a pin member and a second connector comprising a socket for matingly receiving the pin member therein in which one of the connectors is mounted on the front frame member and the other one of the connectors is mounted on the support arm for movement relative to the connector on the front frame member so as to selectively latch the foot rest assembly in the use position by engaging the connectors with one another;
- a release lever extending generally laterally from the support arm in the use position of the foot rest assembly, the release lever being operatively connected to the connector on the support arm for displacing the connector on the support arm relative to the connector on the front frame member to disengage the connectors from one another and release the foot rest assembly from the use position;
- a biasing member which urges the connector on the support arm into engagement with the connector on the front frame member; and
- a top loading camming face on at least one of the connectors which is arranged to displace the connector on the support arm away from the connector on the front frame member against the biasing member when the main arm is displaced vertically downward from a position spaced above the use position towards the use position.

Some embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
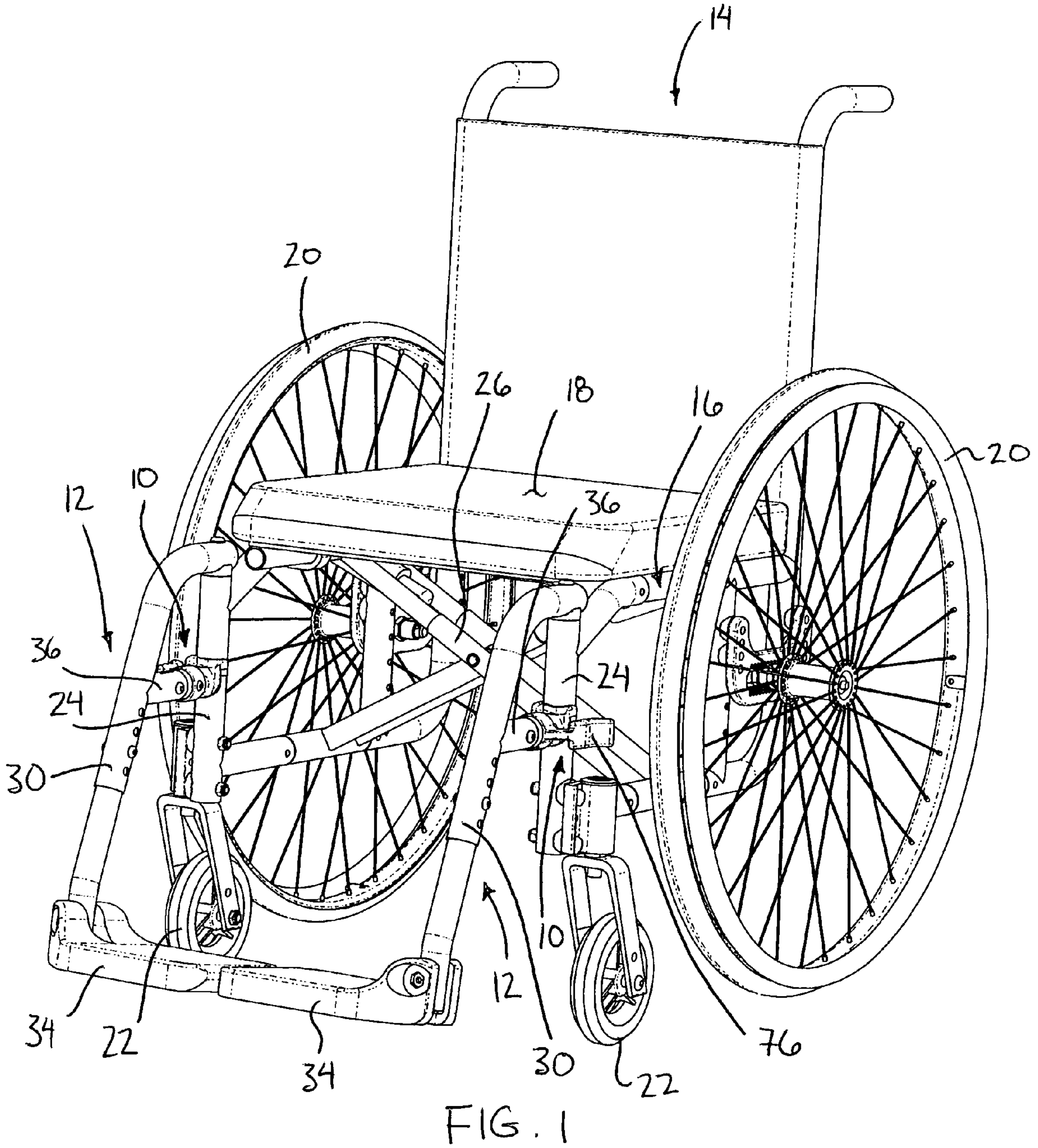
FIG. 1 is a perspective view of a wheelchair with two foot rest assemblies thereon which are latched in the use position.

Referring to the accompanying Figures there is illustrated a wheelchair foot rest assembly latching mechanism generally indicated by reference numeral 10. The latching mechanism 10 is particularly suited for selectively latching the foot rest assembly 12 of a wheelchair 14 in a use position.

The wheelchair 14 according to the illustrated embodiment includes a frame supporting an occupant seat 18 thereon for rolling movement across the ground in a forward direction which the seat faces. The wheelchair includes a pair of large main wheels 20 below the seat 18 towards a rear of the wheelchair and a pair of front castor wheels 22 towards a front of the wheelchair. The frame includes a pair of front frame members 24 which are oriented vertically at the front of the wheelchair, spaced apart from one another at opposing sides of the frame such that each front frame member 24 spans between a top end just below the seat 18 to a bottom end supporting one of the front castor wheels 22 thereon. The frame 16 includes a linkage 26 which permits the frame to be collapsed for storage as desired.

Figure 2:
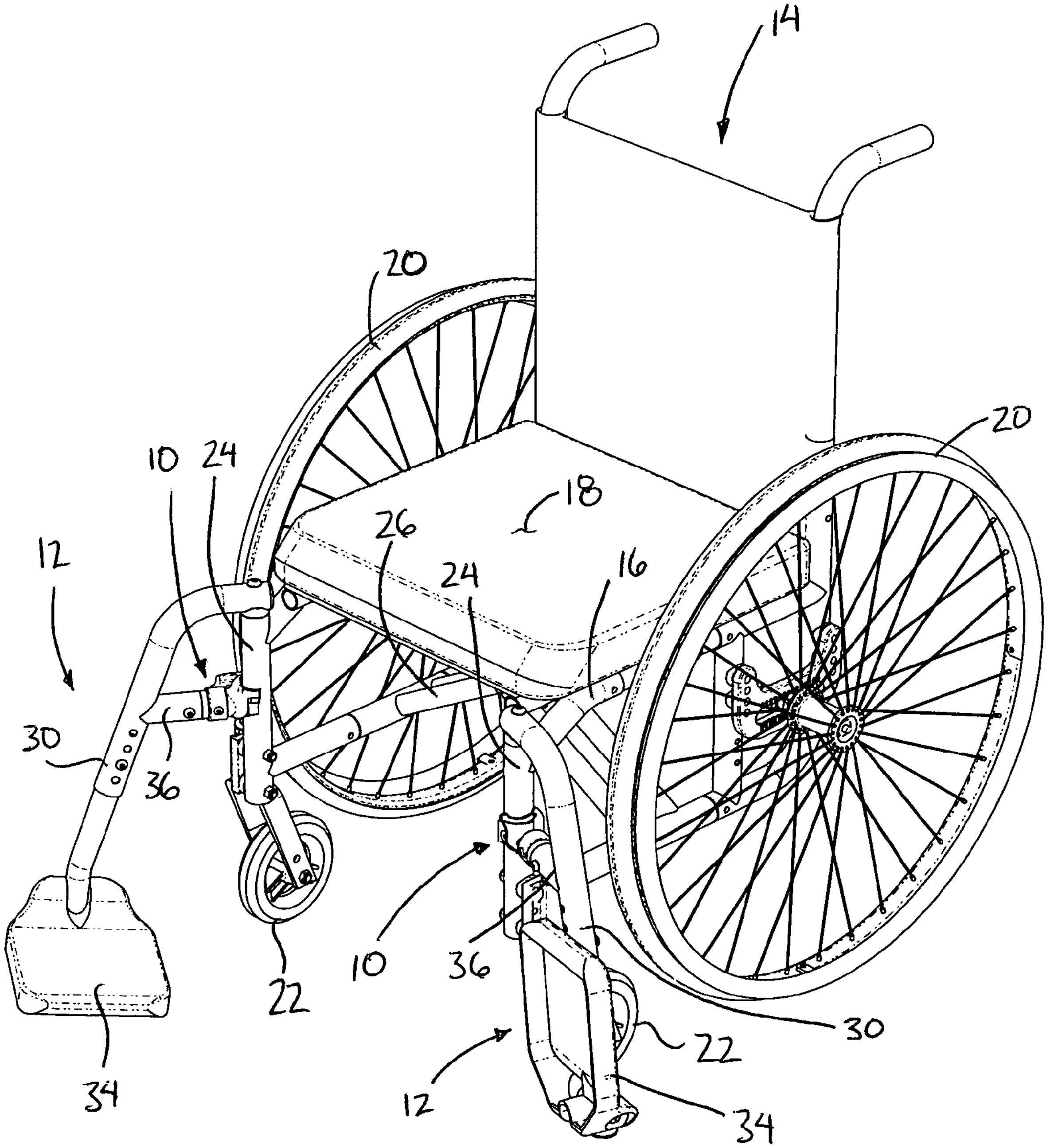
FIG. 2 and FIG. 3 illustrate the foot rest assemblies displaced towards respective outward stored and inward stored positions.
Figure 3:
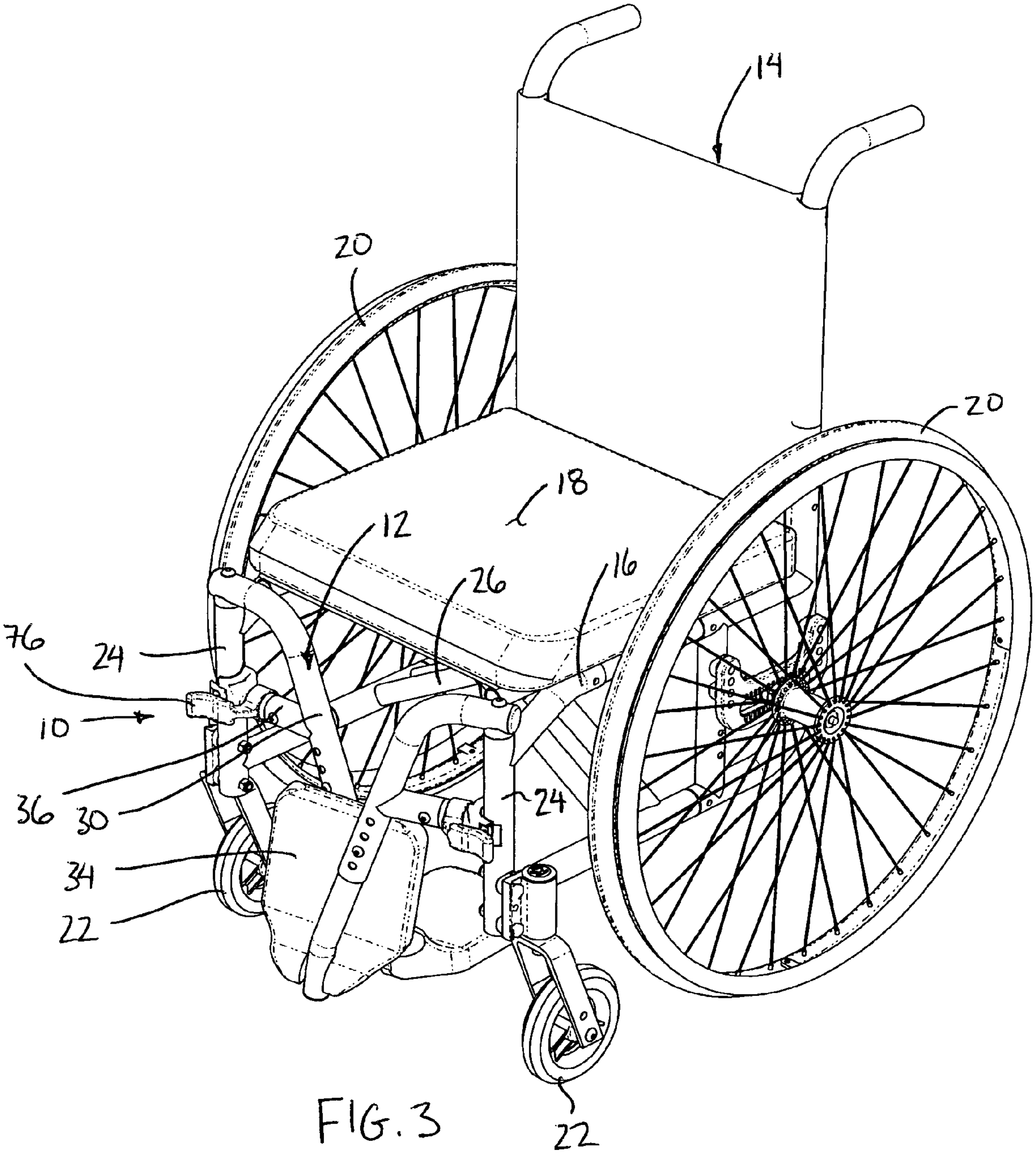
Figure 4:
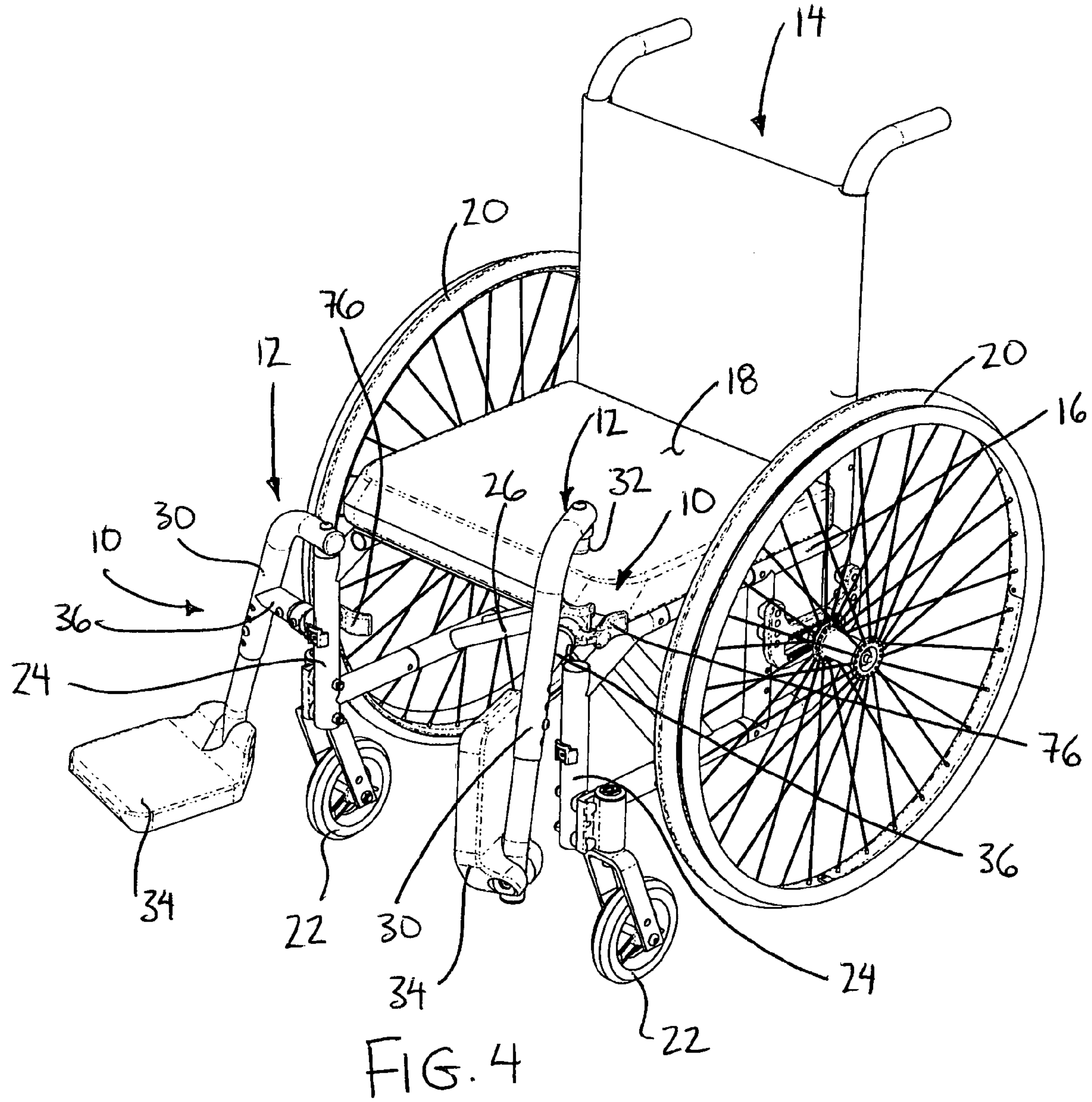
FIG. 4 is a perspective view of the wheelchair with one of the foot rest assemblies shown separated from the frame of the wheelchair.
Figure 5:
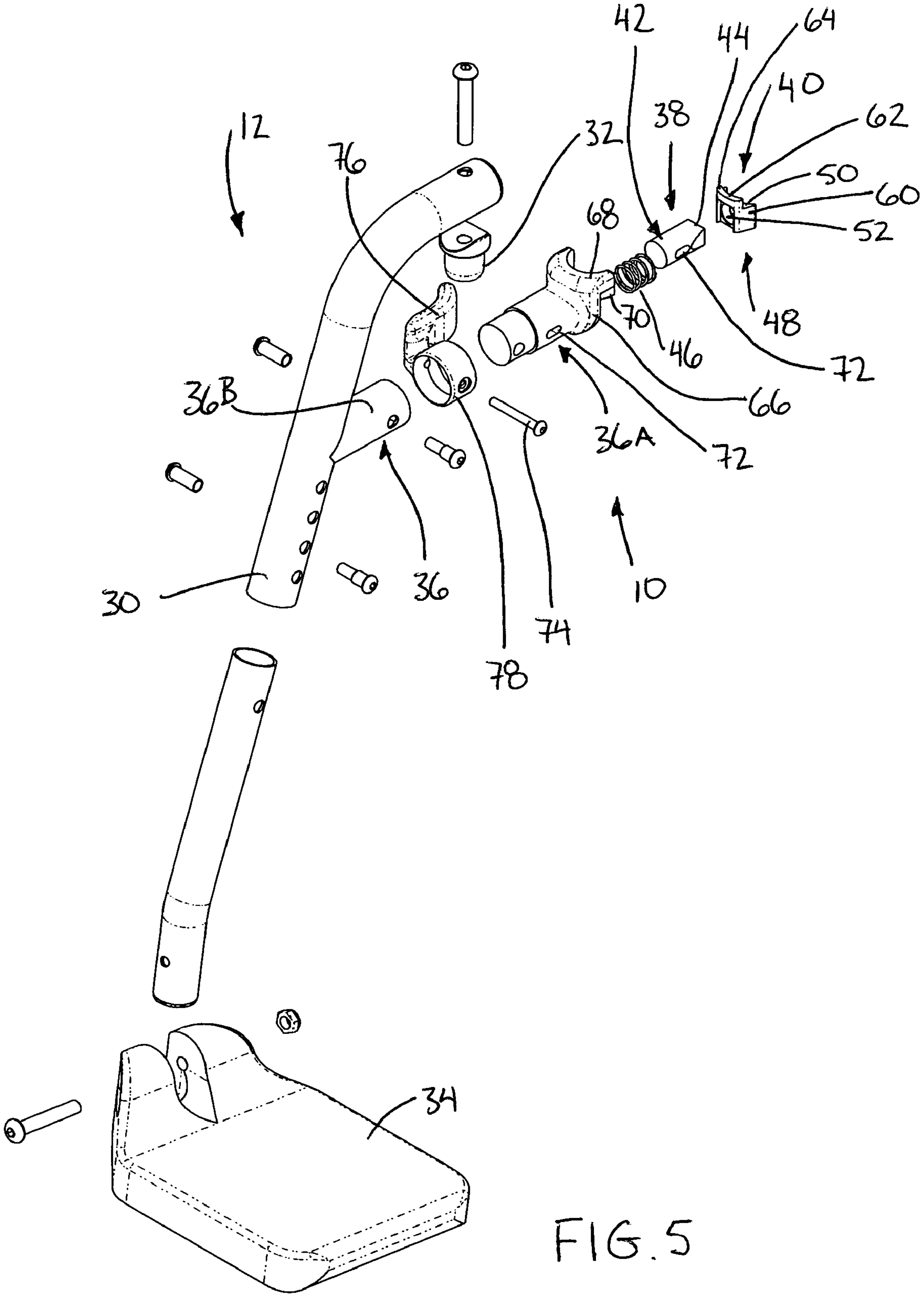
FIG. 5 is an exploded perspective view of one of the foot rest assemblies.
Figure 6:
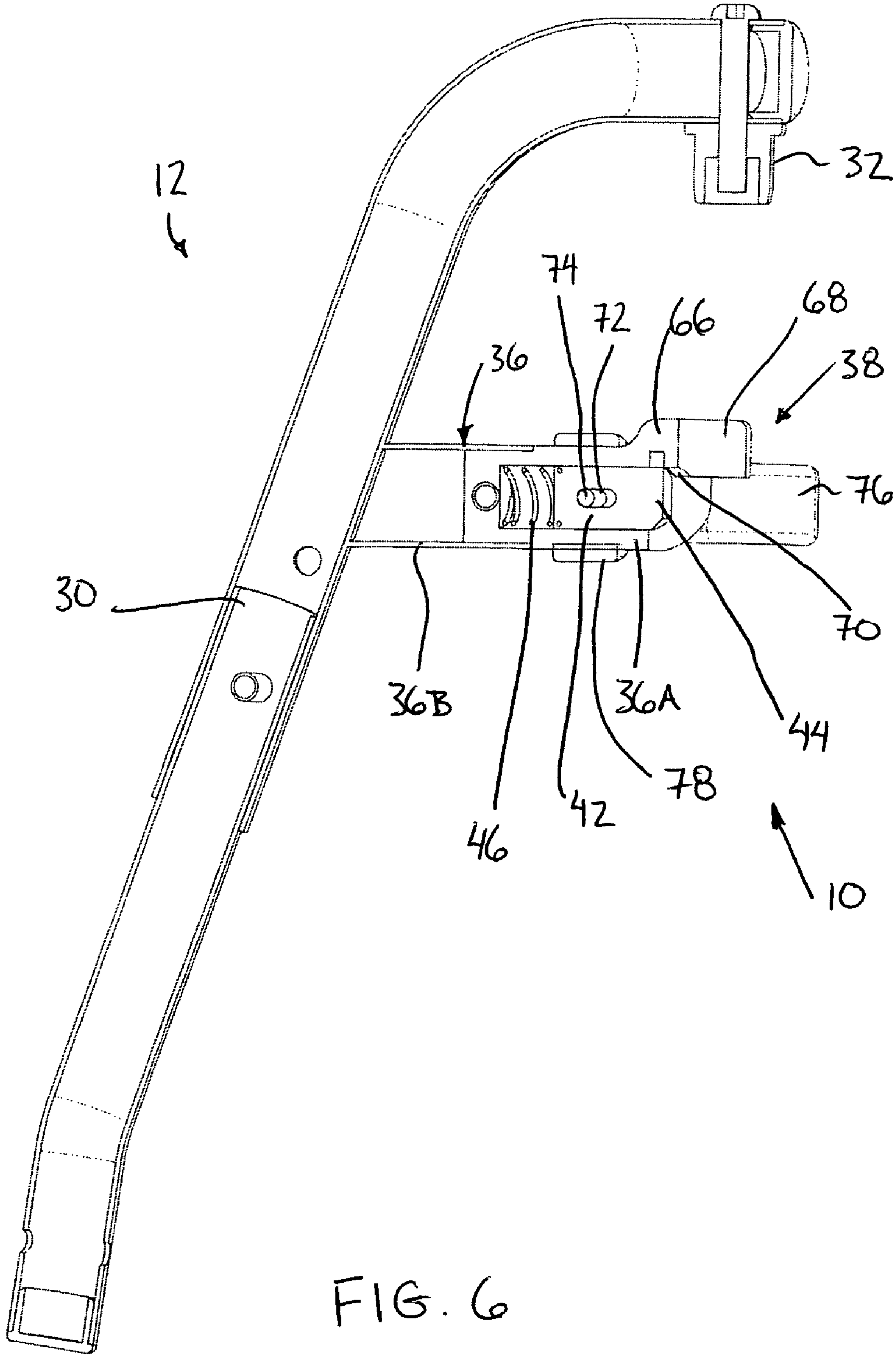
FIG. 6 is a perspective view of a vertical cross section of one of the foot rest assemblies.
Figure 7:
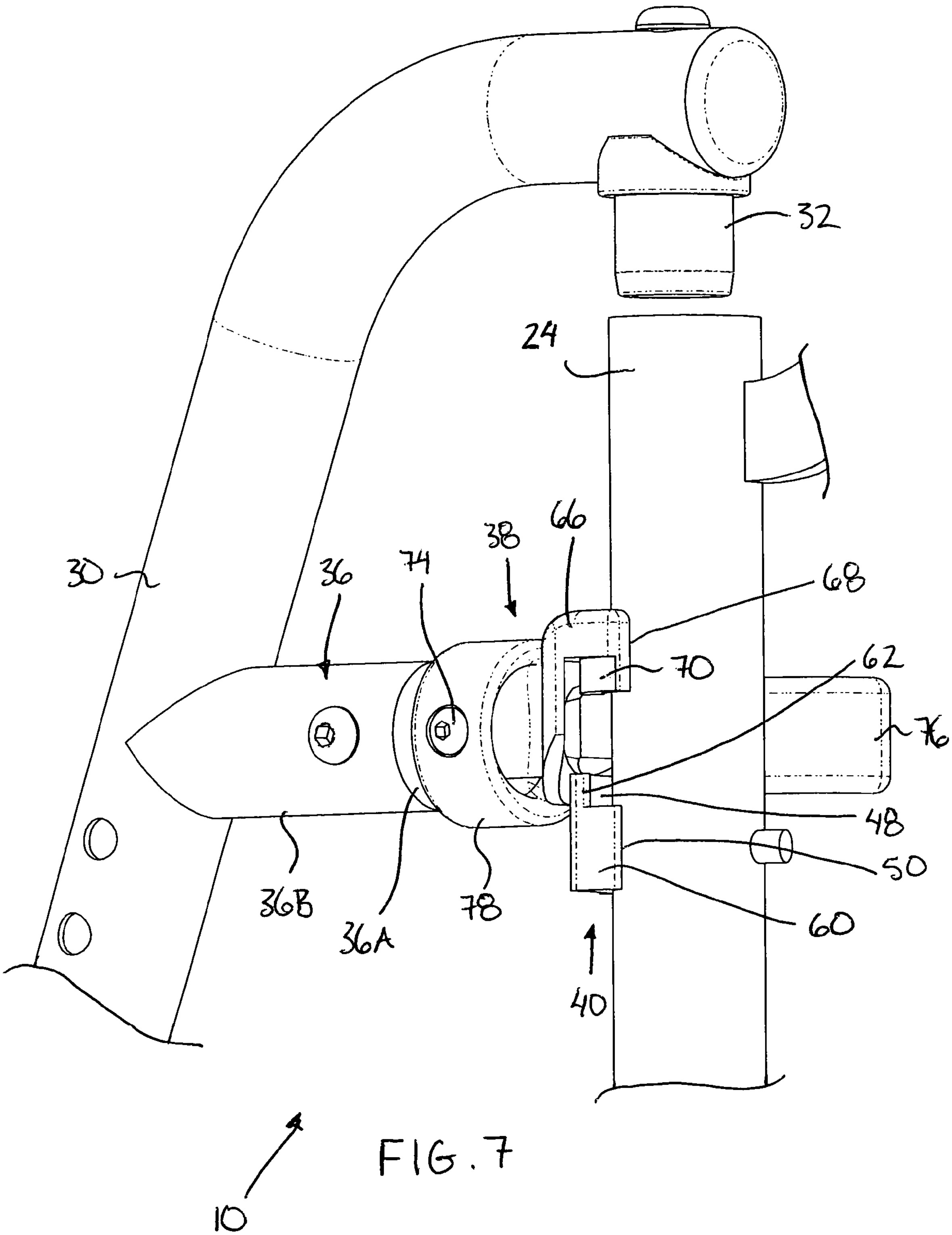
FIG. 7 is a perspective view of the latching mechanism prior to engagement.
Figure 8:
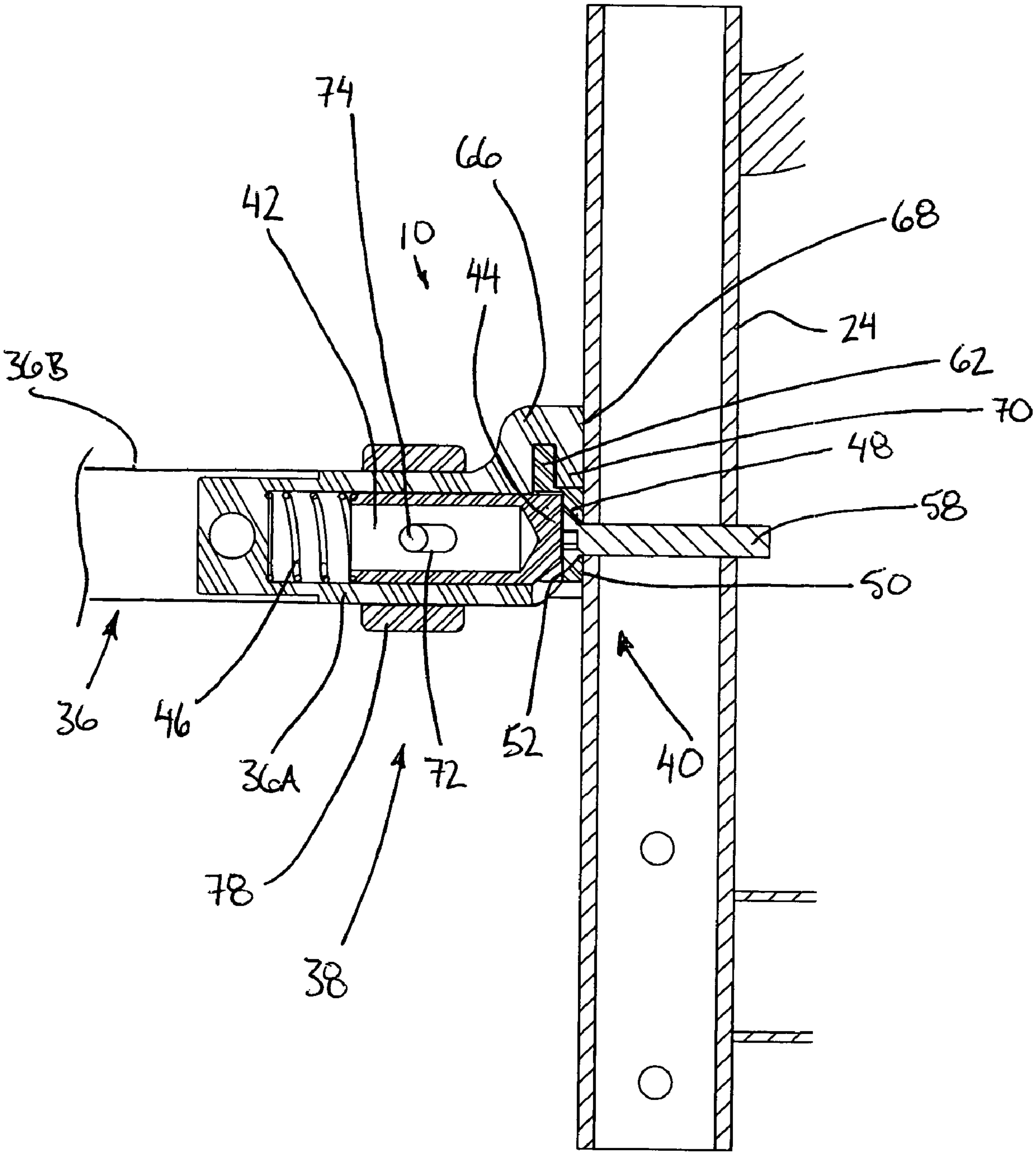
FIG. 8 is a sectional view of the latching mechanism in the engaged position.

A pair of the foot rest assemblies 12 are provided spaced apart at the front of the wheelchair with each foot rest assembly 12 being supported on a respective one of the front frame members 24. Each foot rest assembly 12 is pivotal on the respective front frame member 24 for pivotal movement from a use position as shown in FIG. 1 in which the foot rest assembly extends forwardly from the wheelchair frame, to an outward stored position as shown in FIG. 2 in which the foot rest assembly extends laterally outwardly generally perpendicularly to the forward direction, and to an inward stored position as shown in FIG. 3 in which the foot rest assembly extends laterally inwardly generally perpendicular to the forward direction. At anytime the foot rest assemblies can be released and displaced upwardly into a released position as shown in FIG. 4.

Each foot rest assembly 12 includes a main arm 30 which comprises an elongate tubular member extending from a pivot shaft 32 at a top end thereof to a foot plate 34 at a bottom end thereof. The pivot shaft 32 comprises a vertical shaft which is slidably received through the open top end of the front frame member which comprises a vertical hollow tube. The pivot shaft 32 is pivotal about a vertical pivotal axis of the shaft between the use and stored positions. The main arm 30 extends radially outwardly from a top end of the pivot shaft at a downward incline to the bottom end thereof a vertical distance which is slightly less than the overall height of the top end of the front frame member from the ground.

The foot plate 34 supported on the bottom end of the main arm is hinged about a respective horizontal axis which is oriented to extend forwardly in the use position so as to lie in a common plane with the main arm 30. A lower portion of the main arm 30 is telescopic to adjust the position of the foot plate 34 in the longitudinal direction of the main arm 30 for accordingly adjusting the height of the foot plate 34 relative to the ground. The hinge of the foot plate permits the foot plate to be pivoted upwardly against the main arm 30 to occupy minimal space when in the stored position of FIGS. 2 and 3 for example.

Each foot rest assembly includes a support arm 36 which spans between the main arm 30 and the front frame member spaced below the pivot shaft 32. The support arm 36 is oriented generally horizontally to extend in the forward direction in the use position so as to lie in a common vertical plane with the main arm 30. The support arm 36 thus extends generally radially in relation to the pivot axis of the shaft 32. The support arm 36 joins the main arm 30 above the telescopic portion so as to be in fixed relationship with the upper portion of the main arm 30 and the pivot shaft 32 to which it is coupled.

A latching mechanism is provided for selectively latching the inner end of the support arm 36 to the front frame member in the use position. The latching mechanism comprises a first connector 38 in the form of a pin member which is supported on the support arm 36. The latching mechanism further includes a second connector 40 in the form of a socket member which is mounted on the front frame member 24 of the wheelchair for mating connection with the first connector 38 on the foot rest assembly.

The support arm 36 comprises a hollow tube portion 36A supported at the inner end of a main portion 36B of the support arm. The tube portion 36A of the support arm slidably receives a post 42 therein in which the post 42 has an outer diameter which is near to the inner diameter of the support arm so that the post 42 is coaxially supported within the tube portion 36A at the inner end of the support arm while permitting sliding movement of the post 42 relative to the support arm. The post 42 is thus slidable along a horizontal sliding axis extending in the longitudinal direction of the support arm and the post. The pin member comprising the first connector 38 is defined by the inner free end 44 of the post which projects beyond the tube portion at the inner end of the support arm. A biasing member in the form of a spring 46 is mounted within the hollow interior of the tube portion 36A of the support arm opposite the free end 44 of the post to bias the post 42 defining the first connector 38 towards the second connector 40 on the front frame member and thereby bias the latching mechanism into a latched and engaged position which restricts the foot rest assembly in the use position.

The socket member forming the second connector 40 comprises a body 48 having a curved inner face 50 which is curved about the front side of the tubular front frame member. A front face of the body 48 includes a socket recess 52 formed therein which faces forwardly for receiving the free end 44 of the post forming the first connector therein. The socket recess 52 includes two inner side walls 54 which are vertically oriented and which taper inwardly towards one another from an outer side to an inner side of the recess 52. A top wall 56 of the recess 52 defines a horizontally extending and downward facing shoulder upon which the pin member forming the first connector 38 is retained. A bottom side of the socket recess 52 is open. The body 48 is maintained in fixed relationship with the front frame member 24 by a suitable fastener 58 which is penetrated through the body 48 at the socket recess 52 into the front frame member.

The socket body 48 includes exterior side walls which define side loading camming faces 60 to assist in guiding the pin member of the first connector 38 into the socket recess 52 of the second connector. A top side of the socket body 48 includes a retainer flange 62 which extends upwardly therefrom spaced outwardly from the frame member but parallel thereto so as to be curved about the front frame member 24 while defining a slot of constant radial dimension therebetween which extends in a circumferential direction. The side loading camming faces 60 are sloped to be inclined radially inwardly and rearwardly as the faces extend outward from the socket recess 52 in opposing circumferential directions.

The free end 44 of the post 42 forming the first connector 38 includes side loading camming faces 60 by configuring the free end of the post to have a lateral dimension which reduced towards the free end by tapering both sides of the post inwardly. The dimension and orientation of the side loading camming faces 60 at the free end of the post closely match the orientation and size of the inner sides 54 of the socket recess 52 such that the faces are flat and so that the pin member acts to wedge into the socket member and provide a snug lateral fit between the first and second connectors so as to minimize any wiggle between the foot rest assembly and the wheelchair frame when latched in the use position. A top side of the free end 44 of the post remains generally horizontal in the axial direction to define a shoulder for engaging beneath the top wall 56 of the socket recess in the latched position and thus positively restrict upward displacement of the first connector relative to the second connector in the latched and engaged position. A bottom side of the free end 44 of the post also includes a top loading camming face 64 which is sloped upwardly and inwardly towards the free end.

In use, when the foot rest assembly is oriented to extend forwardly but spaced above and released from the front frame member of the wheelchair, the foot rest assembly can be readily loaded into the use position by simply inserting the pivot shaft down vertically into the hollow open end of the front frame member with the first connector being displaced downwardly overtop of the second connector. The top loading camming faces 64 of the pin member and socket member respectively engage one another and act to urge the pin member outwardly away from the front frame member against the biasing force of the spring 46 to provide clearance for the pin member to be displaced downwardly over the socket body until the free end 44 aligns with the socket recess 52 at which point the biasing member urges the pin member of the first connector back into the socket recess of the second connector so that the top side of the pin member overlaps the top wall 56 of the recess to retain the pin member within the socket until subsequently released.

Alternatively the foot rest assembly can be displaced into the use position by first positioning the foot rest assembly to extend laterally outwardly or laterally inwardly in one of the stored positioned of FIG. 2 or 3. The foot rest assembly is then rotated into the use position at which point the side loading camming faces 60 of the pin member and exterior of the socket body 48 engage one another as the pin member approaches the socket recess to similarly urge the pin member away from the front frame member of the wheelchair and provide clearance for the free end of the pin member to pass overtop of the exterior of the socket body until the pin member aligns with the socket recess at which point the biasing of the spring 46 returns the pin member into the socket to latch the foot rest assembly in the use position.

The tube portion 36A of the support arm is formed integrally with a mounting body 66 at the free end thereof which is arranged for mating with the outer surface of the front frame member of the wheelchair. The mounting body 66 includes a curved inner face 68 which is curved about the exterior of the front frame member to extend circumferentially approximately 180 degrees and thereby assist in locating the support arm relative to the front frame member. The mounting body 66 extends beyond the free end of the pin member and serves to position the pin member for radial alignment with the socket recess 52 of the second connector. The mounting body 66 is positioned above the pin and includes a depending retainer flange 70 at the curved inner face 68 which is arranged to align with a circumferential gap in the socket body 48 between the retainer flange 62 thereof and the outer surface of the front frame member of the wheelchair frame. The retainer flanges 70 and 62 overlap one another in the radial direction when the foot rest assembly is inserted downwardly overtop of the front frame member or is rotated into position in a circumferential direction so that when in the use position the radially overlap of the mounting flanges provides support to prevent the support member from being pulled away from the front frame member of the wheelchair.

The post 42 and the surrounding tube portion 36A of the support arm 36 include transverse apertures 72 extending horizontally therethrough. The two transverse apertures 72 located in the tube portion 36A are located diametrically opposite one another on respective lateral sides. The aperture 72 in the post 42 extends generally horizontally through the post diametrically between the opposed apertures 72 in the tube portion 36A. The apertures 72 in the post and in the tube portion 36A are each elongate in the longitudinal sliding direction of the post in tube portion 36A so that a portion of the apertures 72 remain in alignment with one another as the post is slidably displaced within the tube portion 36A between respective engaged and disengaged positions of the first and second connectors. The apertures are arranged to be substantially aligned with one another when the connectors are released into the disengaged position.

A transverse rocking pin 74 extends horizontally through the apertures 72 while being oriented generally perpendicularly to the longitudinal axis of sliding movement of the post and support arm in the engaged position of the connectors. A vertical dimension of the rocking pin 74 is arranged to be near the height of the apertures 72, but a horizontal dimension in the longitudinal direction of sliding movement is substantially narrower than the elongate shape of the apertures 72 in the longitudinal axis so that the rocking pin 74 is permitted to rock or pivot about a vertical lever axis extending vertically and centrally through the post 42 of the first connector.

When the pin member of the first connector is engaged with the socket recess of the second connector in the latched position of the latching mechanism, the aperture 72 in the post overlaps the apertures in the tube portion 36A only over a limited position in the longitudinal direction corresponding to the longitudinal thickness of the rocking pin due to the biasing of the spring 46. The spring 46 causes the rocking pin to be abutted with respective inner ends of the apertures in the tube portion 36A which are nearest to the front frame member of the wheelchair and abutted against the outer end of the apertures 72 in the post farthest from the second connector on the front frame member. The rocking pin 74 can thus be rotated in either direction about the vertical lever axis corresponding to opposing ends of the rocking pin being displaced within the respective apertures 72 in the tube portion 36A against the biasing of the spring 46 and away from the second connector on the front frame member of the wheelchair.

Figure 9:
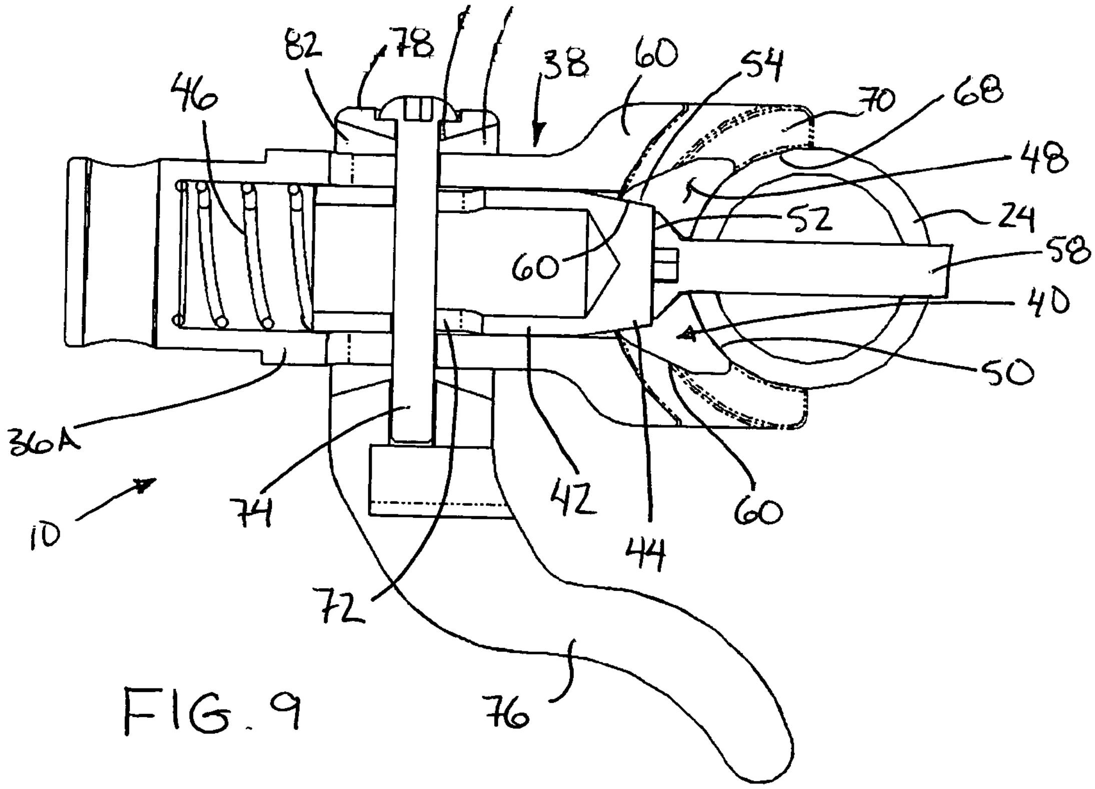
FIG. 9 and FIG. 10 are partly sectional bottom plan views of the latching mechanism in the engaged and disengaged positions respectively.
Figure 10:
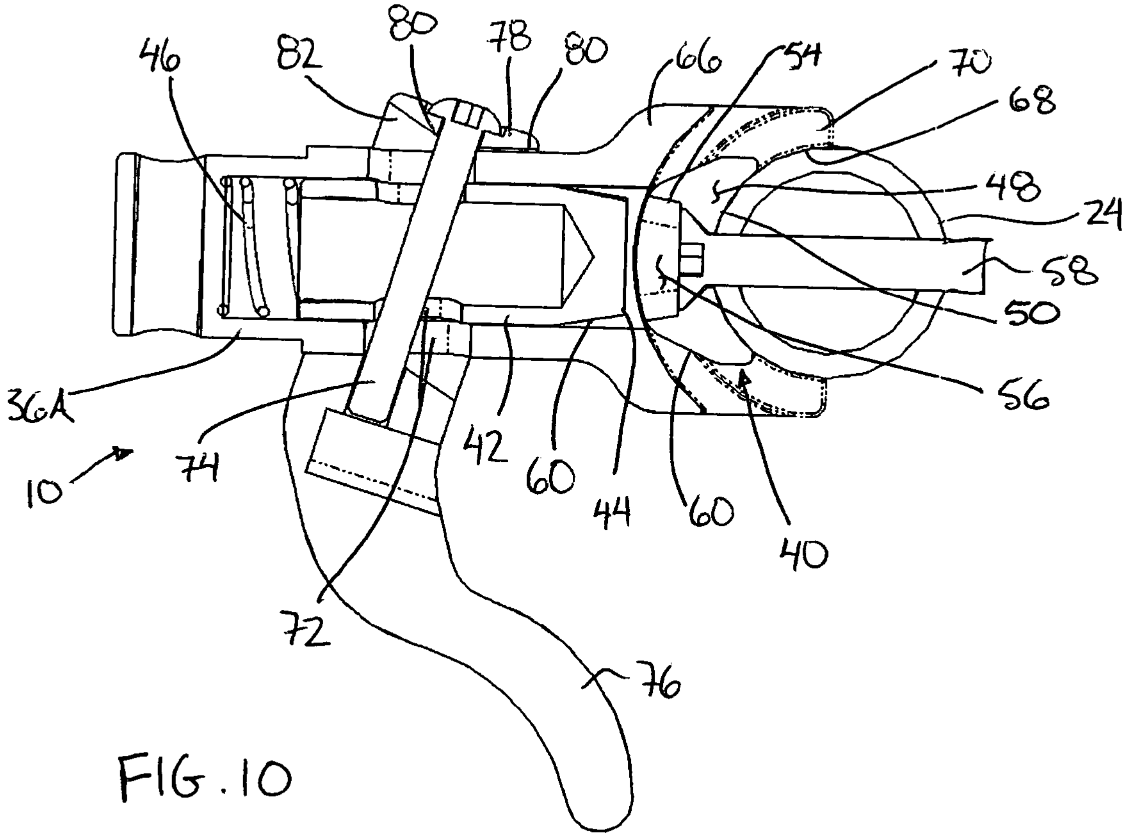

Displacement of one of end of the rocking pin 74 towards the opposing outer end of the respective aperture 72 in the tube portion 36A causes the post 42 to be displaced against the spring 46 sufficiently to release the pin member of the first connector 38 from the socket recess 52 of the second connector to disengage the connectors as shown when the rocking pin is displaced from the engaged position of FIG. 9 to the disengaged position of FIG. 10 of the latching mechanism.

A release lever 76 is coupled to one end of the rocking pin 74 for movement therewith. The release lever 76 extends generally laterally outward from the support arm when the support arm extends forwardly in the use position. The release lever 76 is thus generally pivotal with the rocking pin 74 about the vertical lever axis in two opposing directions corresponding to displacement of the release lever 76 from the engaged position of the latching mechanism into two different released positions in opposing pivotal directions from one another relative to the engaged position.

Figure 13:
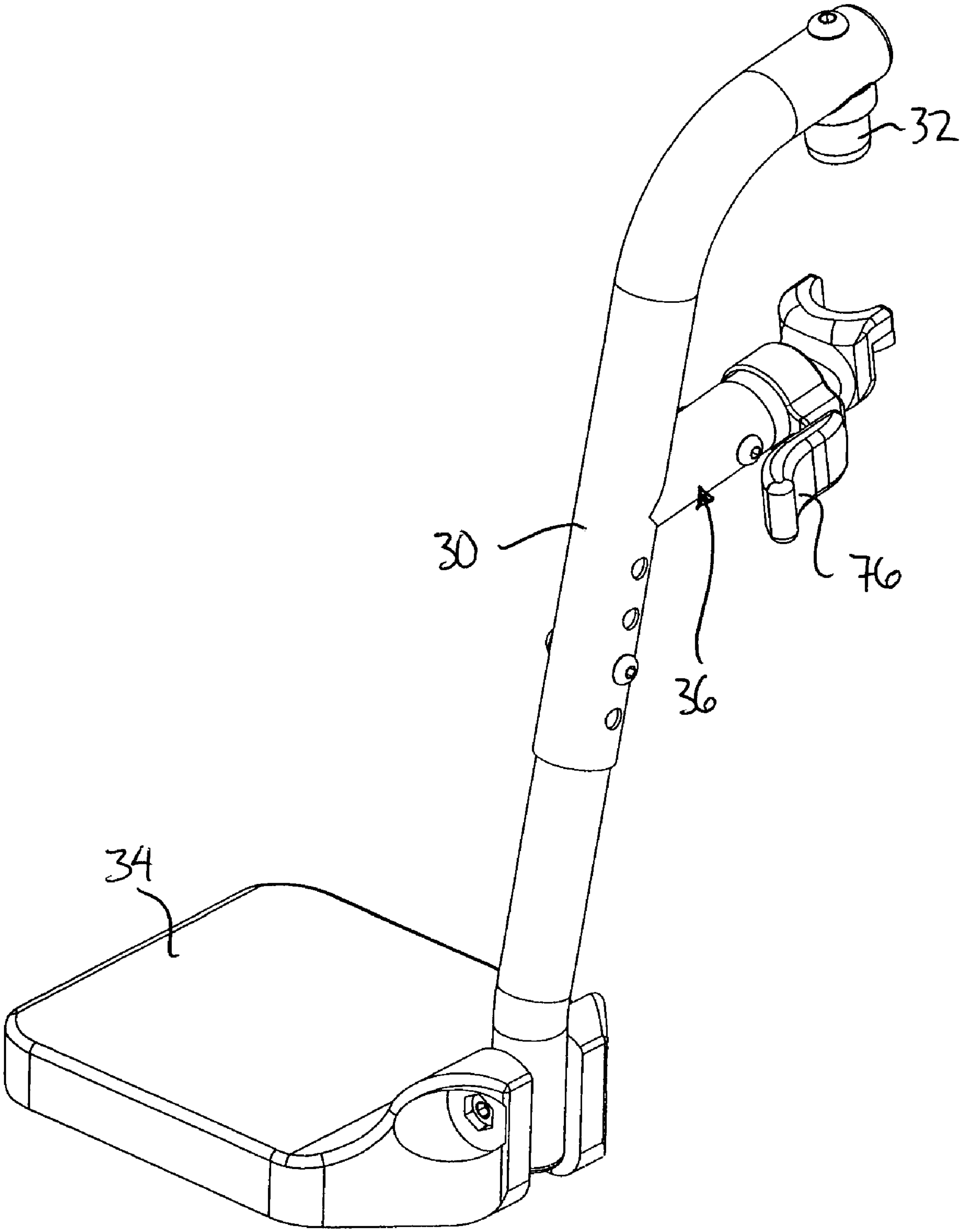
FIG. 13 and FIG. 14 are perspective views of the release lever in first and second respective orientations.
Figure 14:
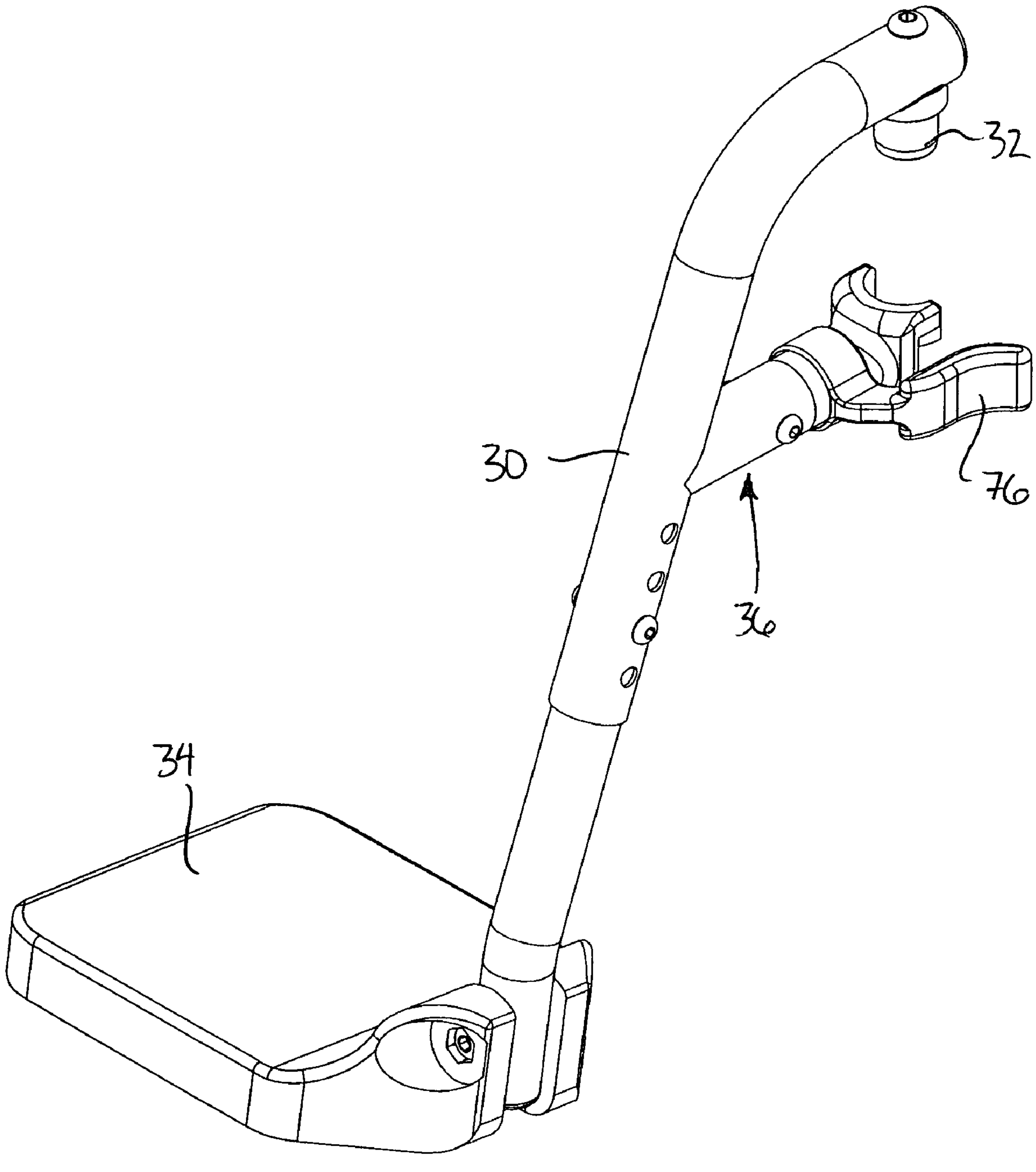

The rocking pin 74 can be inserted through the apertures 72 transversely to the post 42 in a plurality of different orientations corresponding to different orientations of the release lever 76 coupled thereto. For example the release lever 76 can be displaced from a first orientation to a second orientation which is symmetrical about a vertical plane extending through the lever axis and perpendicular to the longitudinal direction of sliding of the post 42 by removing the rocking pin, rotating about its respective longitudinal axis and reinserting the pin. In this arrangement the release lever 76 can be mounted in a first orientation extending laterally outwardly at a forward incline as shown in FIG. 13 and in a second orientation extending laterally outwardly at a rearward incline as shown in FIG. 14 without requiring any replacement of parts. The release lever 76 remains operatively connected to the rocking pin for functional releasing the latching mechanism from the engaged position to a disengaged position by rotating in either one of two opposing directions from the engaged position to two different released positions.

Figure 15:
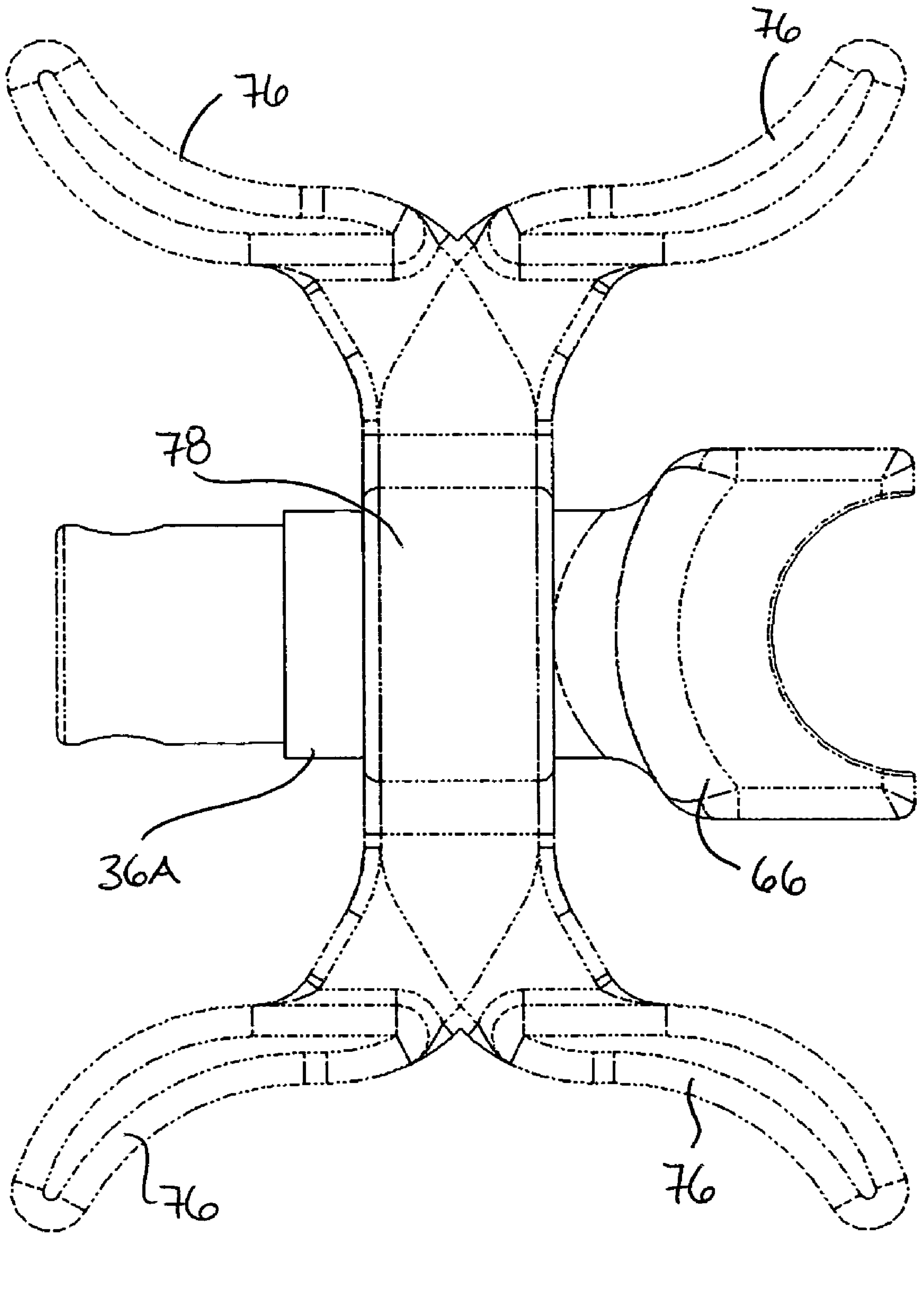
FIG. 15 is a top plan view of the latch mechanism illustrating various orientations of the release lever in broken lines.
Figure 16:
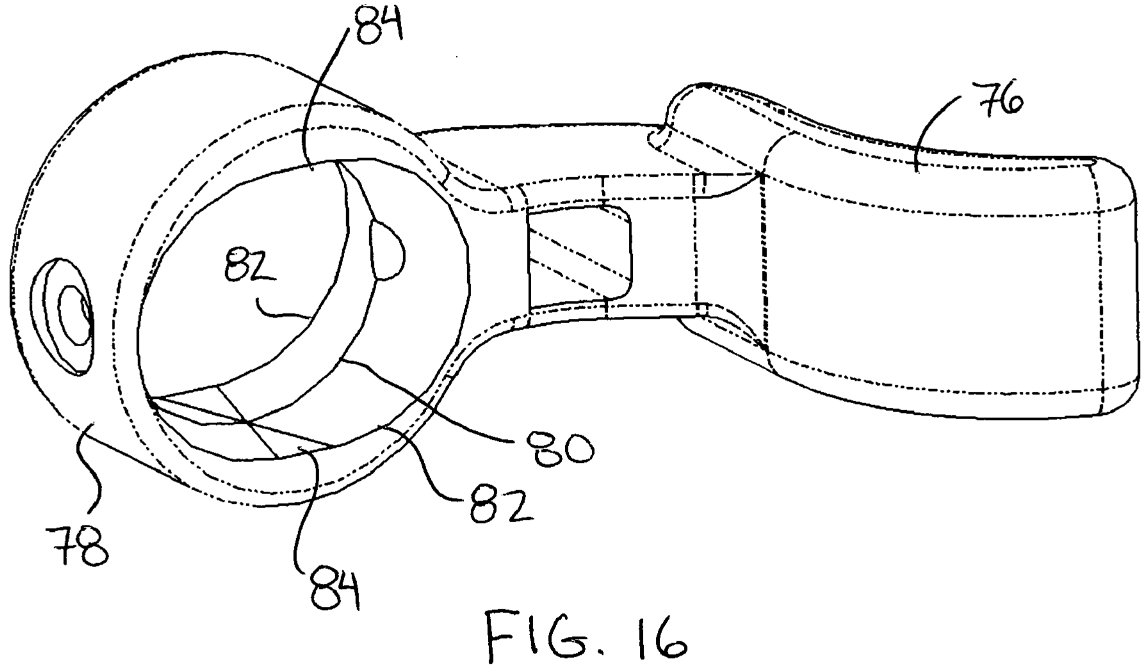
FIG. 16 is a perspective view of a mounting collar according to a first embodiment of the present invention.

The orientation of the release lever 76 can also be varied about a vertical plane in common with the vertical lever axis and the horizontal axis of longitudinal sliding movement of the post by inserting the rocking pin 74 through the inner side aperture 72 in the tube portion 36A first or alternatively through the outer side aperture 72 in the tube portion 36A. As shown in FIG. 15, a release lever which is oriented to extend outwardly and forwardly can accordingly be reversed to alternative orientations which are symmetrical about the lever axis in which the alternative orientations either extend laterally inwardly and forwardly, laterally inwardly and rearwardly or laterally outwardly and rearwardly. In each of the alternative orientations, the release lever remains functional to permit releasing by rotation or pivoting about the lever axis in either one of two opposing directions about the lever axis from the engaged position to different released positions.

Figure 11:
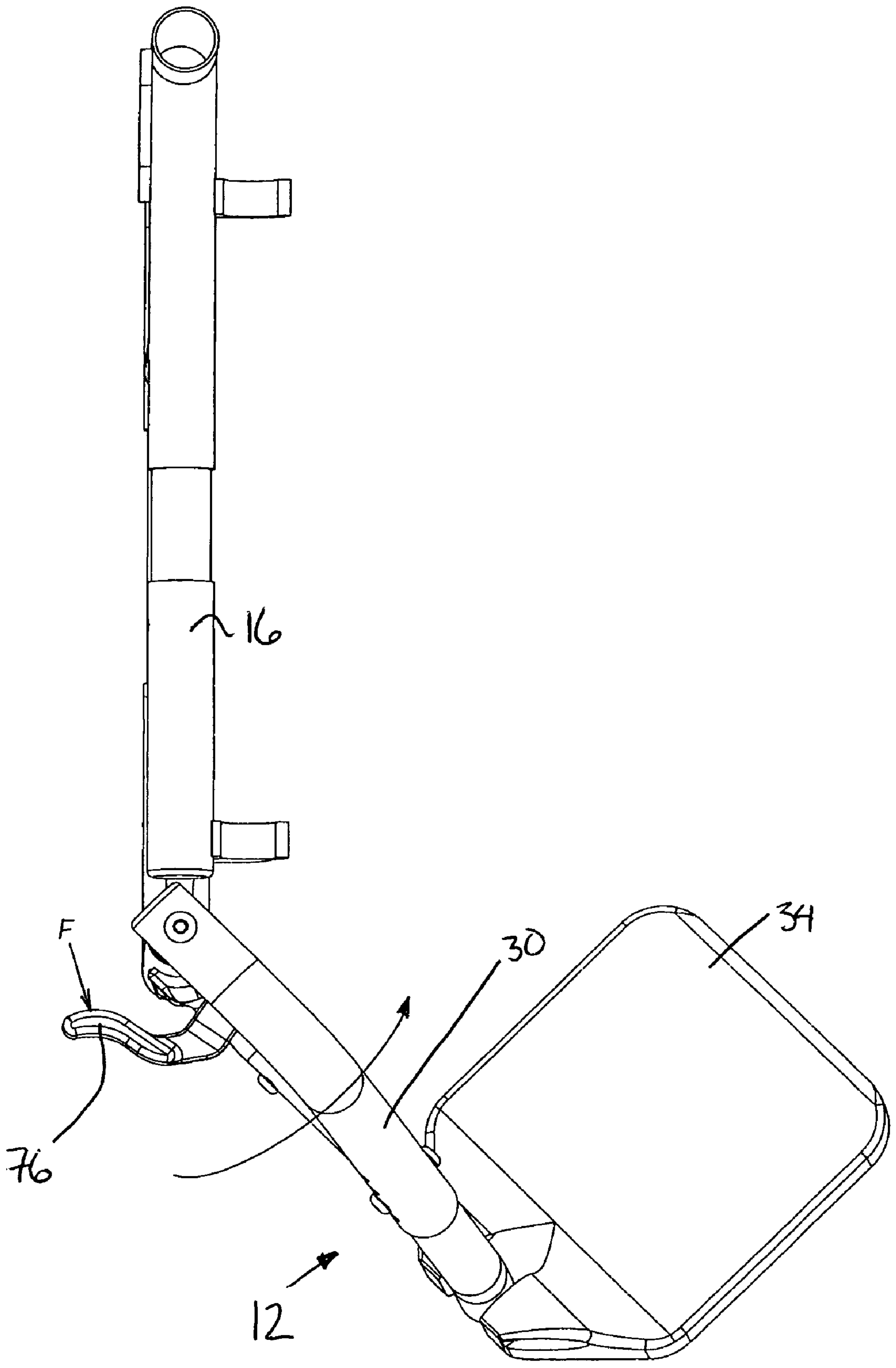
FIG. 11 and FIG. 12 are top plan views of the foot rest assembly being displaced towards the inward stored and outward stored positions respectively.
Figure 12:
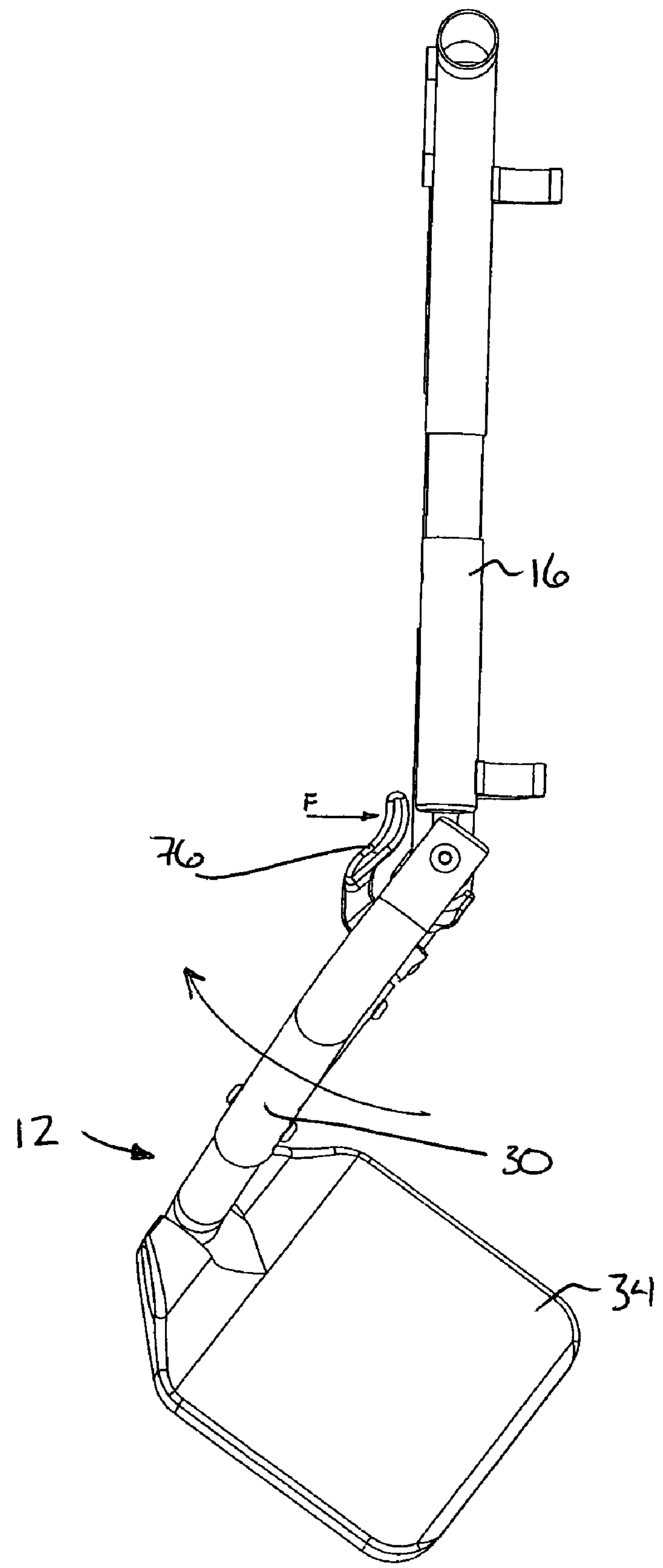

Turning now to FIGS. 11 and 12, due to the ability of the release lever 76 to be deflected or pivoted about the lever axis in two opposing direction for releasing, the release lever can thus always be urged at the free end thereof in the direction of rotation of the foot rest assembly from the use position to one of the stored positions regardless of whether it is desired to pivot the foot rest assembly inwardly into the inner stored position of FIG. 3 or outwardly into the outward stored position of FIG. 2. Accordingly in any orientation, application of a force F to the lever can be arranged to produce a moment which assists in pivoting the foot rest assembly in the desired direction.

With particular reference to FIGS. 5 through 16, a first embodiment of the release lever is shown in which the release lever is coupled to the rocking pin 74 by a mounting collar 78 which is concentrically supported about the support arm 36 in alignment with the apertures 72 for mounting the rocking pin 74 extending diametrically thereacross. An inner surface of the collar 78 has an inner diameter about a central position 80 which is near the exterior diameter of the round tube forming the support arm. The interior diameter at both end portions 82 of the collar 78 however is spaced outwardly from the diameter of the support arm so that some rocking motion of the collar 78 about the support arm is permitted.

Diametrically opposed portions 84 of the interior surface of the collar 78 have a substantially constant interior diameter at opposing end portions 82 and at the central position which is near the outer dimension of the support arm. The opposed portion 84 thus prevent rocking about a horizontal axis and substantially limit any rocking movement between the collar 78 and the support arm to only a rocking movement about the substantially vertical lever axis. The release lever 76 is formed on the exterior of the collar 78 while the rocking pin is inserted through diametrically opposed mounting apertures in the collar so that the release lever, the rocking pin and the collar 78 are all coupled for movement together for generally pivoting movement about the lever axis from the engaged position in opposing directions to respective released positions.

Figure 17:
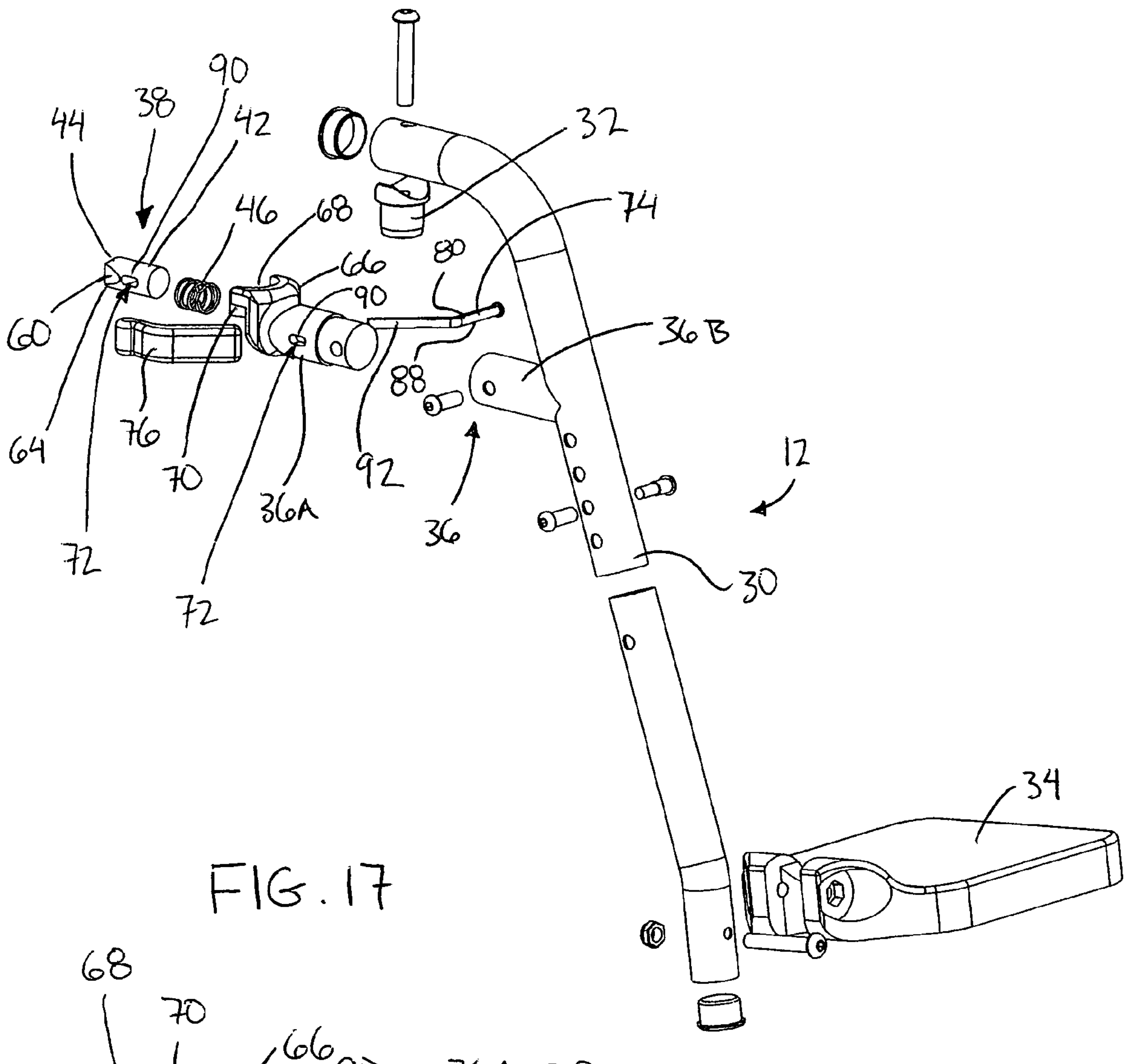
FIG. 17 is an exploded perspective view of a foot rest assembly upon which a second embodiment of the release lever is mounted.
Figure 18:
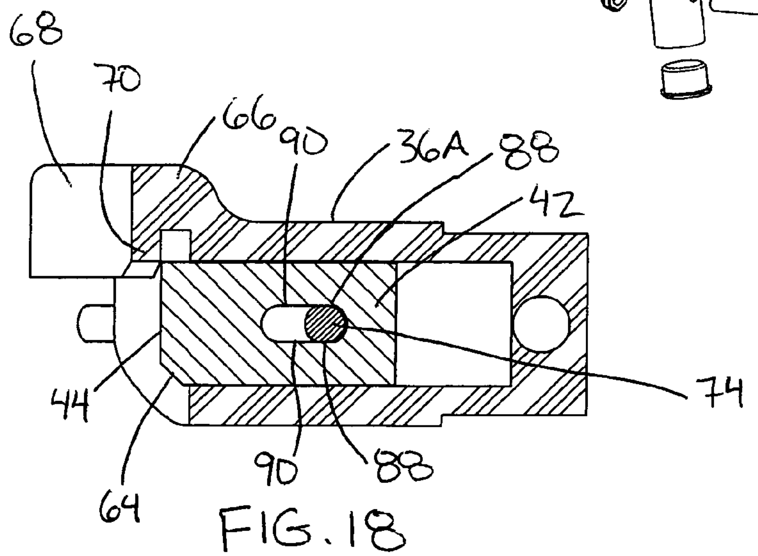
FIG. 18 is a side elevational view of a portion of the support art receiving the rocking pin therethrough in accordance with the embodiment of FIG. 17.

Turning now to FIGS. 17 and 18 there is illustrated a further embodiment of the release lever 76 in which the lever is supported directly on the end of the rocking pin 74. In this instance, one or both of the top and bottom sides of the pin includes a flat surface 88 which mates with a longitudinally extending edge 90 of one or all of the transverse apertures 72 in the post 42 and the support arm so that the mating engagement with the flat surface 88 and longitudinal edge prevent rotation of the pin about its respective axis so that movement between the pin and apertures is limited to rocking movement about the vertical lever axis. An extension 92 is provide at one end of the rocking pin 74 which is angularly offset about a vertical axis to remain generally horizontal in a common plane with the flat side(s) 88 of the pin. The release lever 76 in this instance comprises a handle which is mounted directly on the extension 92 of the rocking pin 74.

In further embodiments, though it is not required, a top side of the retainer flange 62 also defines a top loading camming face 64 which is sloped to extend longitudinally outward and upward as it extends radially inward and rearward.

As described herein, the latching mechanism 10 is an innovation of the foot rest assembly that provides a more rigidly locking latching design coupled with a release mechanism that provides ease of use, improved release and removal, and a user configurable latch to better meet the needs of the user.

The improved wheelchair foot rest latching mechanism has been developed to: improve foot rest rigidity; improve latching and release of the latch; provide ease of latch access; allow the latch handle configuration to suit the user; allow vertical removal and attachment of the foot rest assembly; allow swing-away release both into and outside the wheelchair frame; provide ease of dealer part configuration with no left/right components; and create a very aesthetic design.

Careful attention of design has ensured ease of use and simple operation with a minimum of components and allows an improved and novel approach to the foot rest functionality. The design has a broad application to a wide range of wheelchairs and related mobility aids that incorporate foot rests and other swing-away latching mechanisms.

The methodology of foot rest attachment and swing-away arrangement to which the latching mechanism 10 of the present invention has been applied, has been in use in the industry for more than 12 years, since introduction by Meyra, a German based manufacturer of wheelchairs. The central pin latching concept and top pivot block employed are not new to the industry and many variations of the method can now be found in the marketplace. The innovation that has been developed that is novel is the latching mechanism 10, and more specifically the pin release methodology and pin/latch block (socket member) interface design.

The design of the pin member and socket member utilizes a spring biased central pin as is used in a number of competing products, but is novel in that the end of the pin has chamfered edges to enable it to engage a female receiver (the socket recess) with matching chamfered edges to create a wedging action that allows the latch to exhibit excellent rigidity to the engagement. The reduction in "play" of these two components is a marked improvement in the design. The chamfered edges also allow the pin to automatically retract when rotating the foot rest to the center latched position and to self-center in re-engagement.

Additionally, a lead chamfer is added to the underside of the pin to allow the attachment of the foot rest to the latch block vertically. The pin will automatically retract and engage the latch block when positioned near the centered locking position. The self-centering and wedging action of the present invention overcomes the issue created by tolerance allowance in the prior art.

The use of a self cantilevering rocking pin against a slotted sliding post overcomes many disadvantages of the prior art. The advantages of the rocking pin allow for an assembly that can easily be configured to either left or right handed operation as well as allowing the lever to retract the pin by either actuation in either a forward or rearward motion. The design also provides a more compact design in that the lever arm does not require a pinned fulcrum point and thus a stronger spring can be employed or a shorter lever handle used for the same applied force.

The release lever being configurable is of great advantage to both the user and the dealer who must stock component hardware. The ability to release through either a push or pull motion is an advantage to both user and attendants. In addition, the force applied to the release lever will cause the foot rest to swing-away in the direction of the applied force. The assembly can freely swing either into the frame center or to the outside.

The latching mechanism is illustrated in the application of a swing-away foot rest to be introduced on a folding manual wheelchair. Variations of the latching system could be applied to additional types of wheelchairs and to other mobility products that employ a swing-away latching system, such as commodes or folding walkers. Two designs featuring different actuation lever techniques are illustrated, employing the same principles.

As described above, the lever rod (rocking pin) maintains a linear motion by two different methods, which eliminate the lever from rotating about its axis in the assembly. The first approach uses flat surfaces on either side of the lever rod which contact the sides of the lock pin (post 42) and housing slots (apertures 72), stopping rotation of the rod. The second uses a wrap-around handle (collar 78) that holds the lever rod on either side of the housing and is kept from turning by the radial engagement of the handle.

A straight pin and lever can also be employed requiring no limitation from rotation. The rocking pin could also be configured as a simple sliding pin to retract the lock pin, limited to release through simple pull motion.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A wheelchair comprising a frame supported for forward rolling movement along the ground in which the frame comprises an upright front frame member and a foot rest assembly supported on the front frame member; the foot rest assembly comprising:

a main arm extending downwardly and outwardly from a pivot joint pivotally supporting the main arm on the front frame member for pivotal movement about an upright axis between a use position extending forwardly and a stored positioned extending laterally from the front frame member;

a support arm extending between the main arm and the front frame member below the pivot joint, the support arm comprising a tube member; and a latching mechanism arranged for latching the foot rest assembly in the use position, the latching mechanism comprising:

a first connector comprising a pin member and a second connector comprising a socket arranged for matingly receiving the pin member therein in which one of the connectors is mounted on the front frame member and the other one of the connectors is mounted on the support arm and arranged for movement relative to the connector on the front frame member so as to selectively latch the foot rest assembly in the use position when the connectors are engaged with one another;

a post received within the tube member of the support arm so as to be arranged for sliding movement in a longitudinal sliding direction relative to the tube member, the connector on the support arm being mounted on the post for sliding movement therewith relative to the tube member;

co-operating transverse apertures formed in the post and in the tube member which are elongate in the longitudinal sliding direction of the post;

a transverse rocking member received through the transverse apertures transversely to the longitudinal sliding direction of the post; and a release lever extending generally laterally from the support arm in the use position of the foot rest assembly;

the release lever being connected to the transverse rocking member so as to be arranged for rocking movement with the transverse rocking member within the transverse apertures about a lever axis between an engaged position in which the connectors are engaged with one another so as to prevent pivotal movement of the foot rest assembly in the use position and a disengaged position in which the connectors are disengaged from one another and the foot rest assembly is pivotal from the use position to the stored position.

2. The wheelchair according to claim 1 wherein the release lever is pivotal about the lever axis from the engaged position towards either one of a first released position or a second released position in which the connectors are disengaged from one another in both the first and second released positions, the release lever being pivotal about the lever axis from the engaged position to the first released position in a first direction of rotation and being pivotal about the lever axis from the engaged position to the second released position in a second direction of rotation which is opposite the first direction of rotation.

3. The wheelchair according to claim 2 wherein the release lever is mountable on the support arm in the engaged position in two different orientations which are generally symmetrical with one another about the lever axis.

4. The wheelchair according to claim 3 wherein the lever is mountable in the engaged position in a first orientation extending generally horizontal and inclined into a direction of pivotal movement towards the first released position and in a second orientation extending generally horizontal and inclined into a direction of pivotal movement towards the second released position.

5. The wheelchair according to claim 2 wherein the main arm is pivotal about the upright axis from the use position to a first stored position extending laterally inward and to a second stored position extending laterally outward.

6. The wheelchair according to claim 1 wherein a biasing member is coupled to the post to bias the connector on the support arm towards the connector on the front frame member and wherein the post is arranged to be displaced against the biasing member in the disengaged position.

7. The wheelchair according to claim 6 wherein the transverse apertures are provided on opposing sides of the tube in which both apertures in the tube are elongate in the longitudinal sliding direction of the post and receive the rocking member therethrough such that the rocking member is movable about the lever axis in two opposing directions to displace the post against the biasing member and disengage the connectors from one another.

8. The wheelchair according to claim 1 wherein there is provided a mounting collar mounted concentrically about the tube in alignment with the transverse apertures, the collar having an interior diameter which is spaced outwardly from the tube at respective ends of the collar to permit rocking movement of the collar relative to the tube about the lever axis, the rocking member and the release lever being coupled to the mounting collar for movement therewith.

9. The wheelchair according to claim 8 wherein an inner surface of the collar includes diametrically opposed portions which are near in dimension to an outer diameter of the tube so as to restrict movement of the collar relative to the tube to only the rocking movement about the lever axis.

10. The wheelchair according to claim 1 wherein the rocking member includes at least one flat side slidable along a mating side edge of the transverse apertures so as to restrict pivotal movement of the rocking member about a respective longitudinal axis of the rocking member.

11. The wheelchair according to claim 1 wherein the release lever is mountable on the support arm in a first orientation in which the release lever extends laterally outwardly at a forward incline in the engaged position and a second orientation in which the release lever extends laterally outwardly at a rearward incline in the engaged position.

12. The wheelchair according to claim 1 wherein the release lever is mountable on the support arm in a first orientation extending laterally inward in the engaged position and in a second orientation extending laterally outward in the engaged position.

13. The wheelchair according to claim 1 wherein the release lever is mountable on the support arm in the engaged position in four orientations comprising: extending inwardly and forwardly; extending inwardly and rearwardly; extending outwardly and forwardly; and extending outwardly and rearwardly.

14. The wheelchair according to claim 1 wherein there is provided a biasing member which urges the connector on the support arm into engagement with the connector on the front frame member and a top loading camming face on at least one of the connectors which is arranged to displace the connector on the support arm away from the connector on the front frame member against the biasing member when the main arm is displaced vertically downward from a position spaced above the use position towards the use position.

15. The wheelchair according to claim 14 wherein at least one of the connectors includes side loading camming faces thereon arranged to displace the connector on the support arm away from the connector on the front frame member against the biasing member when the main arm is pivoted from the stored position to the use position.

16. The wheelchair according to claim 14 wherein the first connector is mounted on the support arm and the second connector is mounted on the front frame member and wherein there is provided a top loading camming face on a lower face of the first connector and a top loading camming face on an upper side of the second connector.

17. The wheelchair according to claim 14 wherein there is provided a first retainer flange mounted on the front frame member to be spaced outwardly therefrom and which extends generally upwardly and a second retainer flange mounted on the support arm extending downwardly and being received between the first retainer flange and the front frame member in the use position.

18. The wheelchair according to claim 1 wherein the pin member tapers towards a free end thereof for wedging engagement within the socket when the first and second connectors are engaged with one another.

19. The wheelchair according to claim 18 wherein there is provided a biasing member which urges the connector on the support arm into engagement with the connector on the front frame member and wherein there is provided a camming face formed on the pin member which defines the tapering free end of the pin member and which urges the first connector away from the second connector against the biasing member when the main arm is displaced towards the use position.

20. The wheelchair according to claim 18 wherein a lateral dimension of the pin member is reduced towards the free end thereof to provide a snug lateral fit of the pin member within the socket.

21. The wheelchair according to claim 1 wherein the lever axis is upright in orientation.

* * * * *